US011405767B2

(12) United States Patent
Brooks

(10) Patent No.: US 11,405,767 B2
(45) Date of Patent: Aug. 2, 2022

(54) METHOD AND SYSTEM FOR RETRACTING A FALSE EMERGENCY ALERT

(71) Applicant: T-Mobile USA, Inc., Bellevue, WA (US)

(72) Inventor: Terri L. Brooks, Prosper, TX (US)

(73) Assignee: T-MOBILE USA, INC., Bellevue, WA (US)

( * ) Notice: Subject to any disclaimer, the term of this patent is extended or adjusted under 35 U.S.C. 154(b) by 47 days.

(21) Appl. No.: 17/012,989

(22) Filed: Sep. 4, 2020

(65) Prior Publication Data

US 2022/0078596 A1 Mar. 10, 2022

(51) Int. Cl.
*H04W 4/90* (2018.01)

(52) U.S. Cl.
CPC ..................... *H04W 4/90* (2018.02)

(58) Field of Classification Search
CPC ........................................ H04W 4/90
USPC ...................................... 455/404.1
See application file for complete search history.

(56) References Cited

U.S. PATENT DOCUMENTS

| 7,228,121 | B2 | 6/2007 | Kennedy | |
|---|---|---|---|---|
| 8,037,151 | B1 | 10/2011 | Daly et al. | |
| 9,432,829 | B1 * | 8/2016 | Holthausen | H04W 4/12 |
| 2011/0153762 | A1 * | 6/2011 | Brabec | H04L 51/00 709/206 |
| 2014/0218537 | A1 * | 8/2014 | Nepo | G08B 25/009 348/158 |

* cited by examiner

Primary Examiner — Ted M Wang
(74) Attorney, Agent, or Firm — Loeb & Loeb LLP

(57) ABSTRACT

A method and a system for communicating a correction to an electronic emergency alert message from an electronic emergency alert system to a plurality of electronic devices are disclosed. The electronic emergency alert message, which includes a free form electronic text message and an emergency indication, and an electronic correction indication of the electronic emergency alert message are transmitted. An electronic quick alert message is transmitted to address the electronic correction of the emergency alert message. The electronic quick alert message includes a first text segment comprising predetermined text to indicate a correction to the electronic emergency alert message is being transmitted and a second text segment comprising at least a portion of the free form text message.

16 Claims, 4 Drawing Sheets

Emergency Alert Message:

Quick Alert Message:

Update Message:

14:45 PST    On 8/15/2020 at 10:30am PST, an emergency alert was sent re: a missile launch off the coast of California. This alert was sent in error due to a malfunctioning sensor. We apologize for any inconvenience this error may have caused.

METHOD AND SYSTEM FOR RETRACTING A FALSE EMERGENCY ALERT

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, when an erroneous or false emergency alert message is mistakenly broadcast to the public via a telecommunication system (e.g., Wireless Emergency Alert (WEA), Emergency Alert System (EAS) or other), the alert originator has the option of sending a cancel or update. A cancel will cause the broadcast of the false information to cease, but it does not inform the public that the alert being cancelled was erroneous or false. The other option is for the alert originator to formulate a follow-up message to explain the situation and send it in an update. Upon receiving an update, the wireless carrier's system will perform the two-step process of a cancellation of the broadcast followed by initiating a new alert with the additional information provided by the alert originator. However, significant time may pass between the original false alert and the update. In both situations, those people who received the original false alert may continue to spread the false information to others and/or act in accordance with the emergency alert (e.g., panic, evacuate, take shelter, stock up on essential supplies, etc.). Thus, there exists a need for a system and method for sending a quick or instant alert to inform the public that a previously transmitted emergency alert message was false or sent in error.

SUMMARY

A method and system for communicating a correction to an electronic emergency alert message from an electronic emergency alert system to a plurality of electronic devices are disclosed. The method and systems include the transmitting of the electronic emergency alert message. The electronic emergency alert includes a free form electronic text message and an emergency indication. An electronic correction of the electronic emergency alert message is transmitted. An electronic quick alert message is transmitted to address the electronic correction of the emergency alert message. The electronic quick alert message includes a first text segment comprising predetermined text to indicate a correction to the electronic emergency alert message is being transmitted and a second text segment comprising at least a portion of the free form electronic text message.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
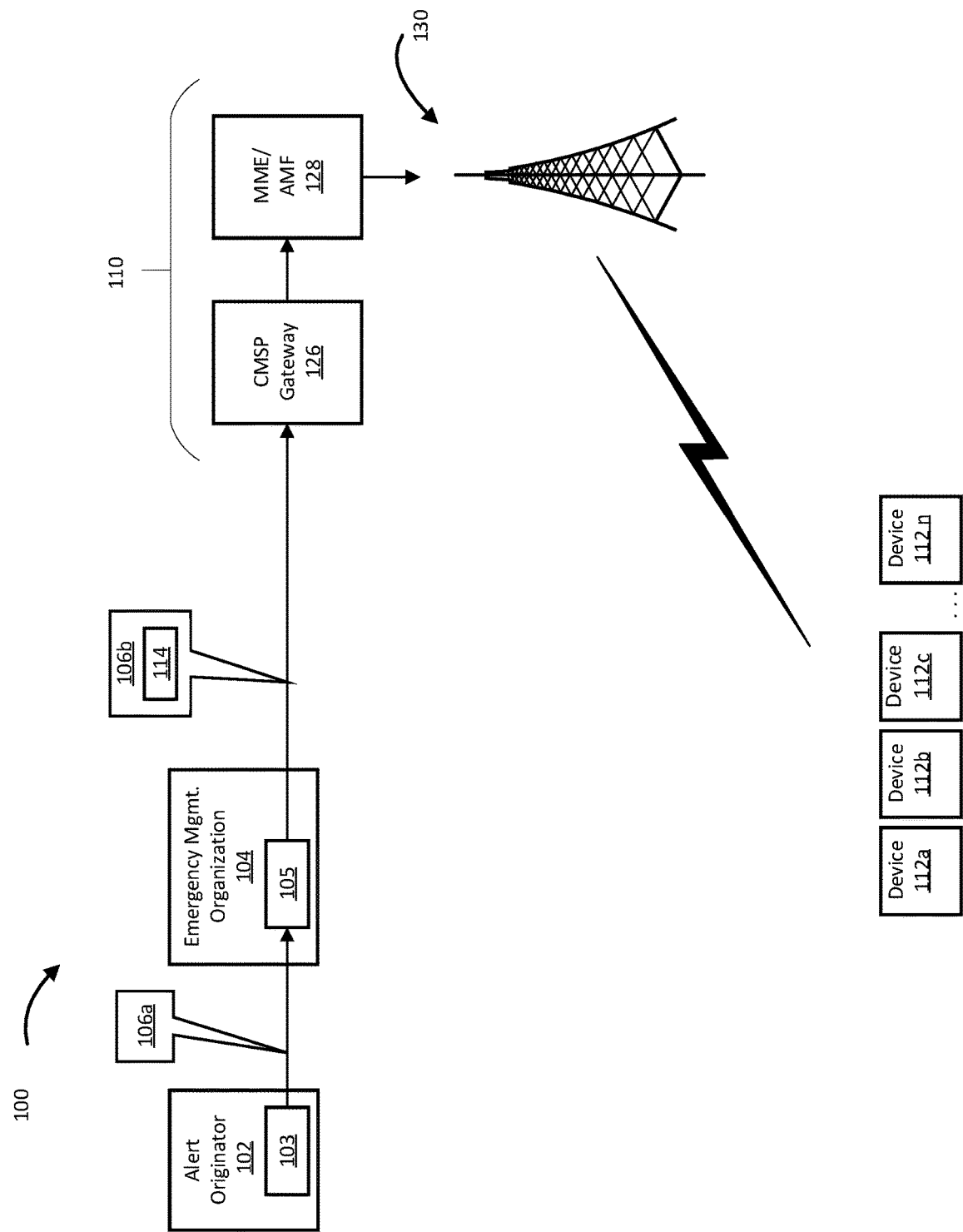
FIG. 1 is a schematic of an embodiment of an electronic emergency alert system in accordance with the current disclosure.

At a high level, an electronic emergency alert system, there are several key players: an alert originator; an emergency alert gateway; and, a communications system.

The alert originator may be any authorized alert originator (e.g., an organization, company, or agency) that learns of an emergency situation. The alert originator may prepare an initial electronic emergency alert message, which may be sent to the federal emergency alert gateway. The emergency alert gateway may be, for example, the Federal Emergency Management Agency Integrated Public Alert and Warning System (FEMA IPAWS). The alert originator may prepare and send emergency alerts for a wide variety of emergency situations including, but not limited to, imminent danger and public safety alerts (e.g., dangerous weather, wildfires, national security threats, toxic spills, dangerous fugitives), and/or an AMBER (lost children).

The emergency alert gateway may receive the emergency alert message from the alert originator. The emergency alert gateway may be associated with an emergency management organization (e.g., FEMA). The emergency management organization may be a state or federal agency or organization, for example, that may be responsible for dispatching aid or other assistance to the people and areas affected by the emergency situation. The emergency alert message received may be provided in a standard protocol format which may need to be converted into another format for transmission to the communication system. The emergency alert gateway may handle the conversion of the emergency alert and the sending of the converted message to the communication system.

The communication system may receive the converted emergency alert message, convert it to a format that can be used in the broadcast, and transmit it to devices that are in the network. The communication system may be a television broadcast system, radio broadcast system, or a wired or wireless telecommunications system. The devices may be radios, televisions, or computing devices such as mobile phones, laptop computers, tablets and the like.

In a wireless telecommunication system, for example, after the emergency alert is sent to a computing device such as a mobile phone, the emergency alert is rebroadcast every 5 minutes until it is cancelled by the alert originator or the emergency alert gateway. If the emergency alert message is cancelled, it won't rebroadcast; but, if someone was presented with the alert message before it is cancelled, then they won't know it was cancelled and will act based on the information received. Also, the device will retain the alert information for later recall and viewing by the user even if the mobile phone is no longer connected to the wireless communication system's network.

At times, alert originators will mistakenly send an emergency alert even though no emergency actually exists, or possibly send an authentic alert but with a key or critical part of the alert information being incorrect (e.g., location of the alert, some portion of the text message is incorrect). The methods discussed herein may be used to address all of these scenarios. In addition, different options may be provided for complete retraction with instructions to wait for further information, versus an indication that some information included was in error, and a correction is on the way. When a false emergency alert is sent, a couple of options are available to minimize the spread of erroneous information, including cancelling the alert, sending an update, and/or sending a brand new alert message. Usually, when a false emergency alert is sent, an update is sent, and the original emergency alert is cancelled.

However, in very serious false alert situations such as a false indication that a missile launch or other imminent threat has occurred, the alert originator and/or the emergency management organization may need extra time to prepare a more comprehensive update. For a large alert area, time is especially critical because once people receive the original message, they often spread it to other people either directly through speaking or through social media and other communication outlets, which may result in panic or a run on essential supplies, like food and water. Another example of a need for a quick retraction would be if this alert is sent over a wireless communications system, mobile devices could move out of the area soon after receiving the broadcast. A delay in the follow-up broadcast which announces a retraction will result in the new broadcast not reaching mobile devices that have already exited the alert area. Therefore, there exists a need for an electronic quick alert that can be generated quickly (preferably in near real-time) and sent as soon as possible after a false emergency alert is sent to minimize and slow down the spread of incorrect information.

Although the descriptions below may be directed to an exemplary implementation of an electronic emergency alert system via a wireless telecommunications system, the methods and systems described therein are applicable to other communication systems including television and radio broadcast systems (e.g. WEA, EAS, National Oceanic and Atmospheric Administration (NOAA), etc.).

FIG. 1 illustrates an exemplary electronic emergency alert system 100. In one embodiment, the electronic emergency alert system 100 may be used for sending a WEA to mobile devices. The electronic emergency alert system 100 may include a source of emergency information, e.g., an authorized alert originator 102 or an emergency management organization 104. In one embodiment, the source of emergency information may be a government or quasi government organization or agency. For example, the alert originator 102 may be the U.S. Weather Service, U.S. Coast Guard or other military branch, the Federal Bureau of Investigation, or State Police, and the emergency management organization 104 may be, for example, FEMA.

The alert originator 102 may include one or more alert devices 103. The alert originator 102 may be in communication with the emergency management organization 104, via the one or more alert devices 103 and an emergency alert gateway 105 associated with the emergency management organization 104. The alert originator 102 may use the one or more alert devices 103 to prepare and generate a standard protocol emergency alert message 106a that includes free form text. The free form text may provide information about an emergency situation (see, for example, free form text 108 in FIG. 3A). The alert originator 102, via the one or more alert devices 103, may send the emergency management organization 104 the standard protocol emergency alert message 106a in the format specified for the emergency alert gateway 105. In one embodiment, the standard protocol emergency alert message 106a may be a Common Alerting Protocol (CAP) message. In other embodiments, the standard protocol emergency alert message 106a may be in a format compatible with EAS or NOAA.

The emergency alert gateway 105 may convert the standard protocol emergency alert message 106a into an electronic emergency alert message 106b (collectively, 106a and 106b may be referred to as "106") that is suitable for a communications system's interface such as wireless communications system 110. For example, in a WEA system, the emergency alert gateway 105 may covert a CAP message into a Commercial Mobile Alert for C Interface (CMAC) message, before the emergency alert message is sent to the wireless telecommunications system 110 for broadcast.

The emergency alert gateway 105 may be in communication with the wireless telecommunications system 110. The emergency alert gateway 105 may transmit the electronic emergency alert message 106b to the wireless telecommunications system 110 for transmission to one or more electronic devices 112a, b, c, . . . n (collectively, 112a, 112b, 112c, . . . , 112n may be referred to as "112"), which may be in the wireless telecommunication system's network. The electronic emergency alert message 106b may include a free form electronic text message 108 (see FIG. 3A) and an emergency indication 114.

In one embodiment, the wireless telecommunications system 110 may have or be associated with multiple components and entities including a commercial mobile service provider (CMSP) gateway 126, a mobility management entity (MME) or Access and Mobility Management Function of (AMF) 128, and a radio access network 130 including one or more radio base stations (eNodeB and/or gNodeB), all of which may contain one or more servers and processors. At a high level, the emergency alert gateway 105 may transmit the electronic emergency alert message 106b to the CMSP gateway 126. That CMSP gateway 126 may convert the electronic emergency alert message 106b to a format that can be used for the broadcast. For example, the CMSP Gateway 126 may encode the information contained in the electronic emergency alert message 106b, which may then be signaled through the MME or AMF (4G versus 5G) to the RAN, which may in turn broadcast the emergency alert to the one or more devices 112.

The wireless telecommunication system 110 may offer one or more cellular services such as voice calls, text, and data. The one or more electronic devices 112 may be a laptop, tablet, mobile phone, smart phone, desktop computer, or any other computing device, and may be associated with one or more users who are subscribers of the wireless network provided by wireless telecommunication system 110. The wireless network may be 2G, 3G, 4G, 5G or any other network type.

Figure 2:
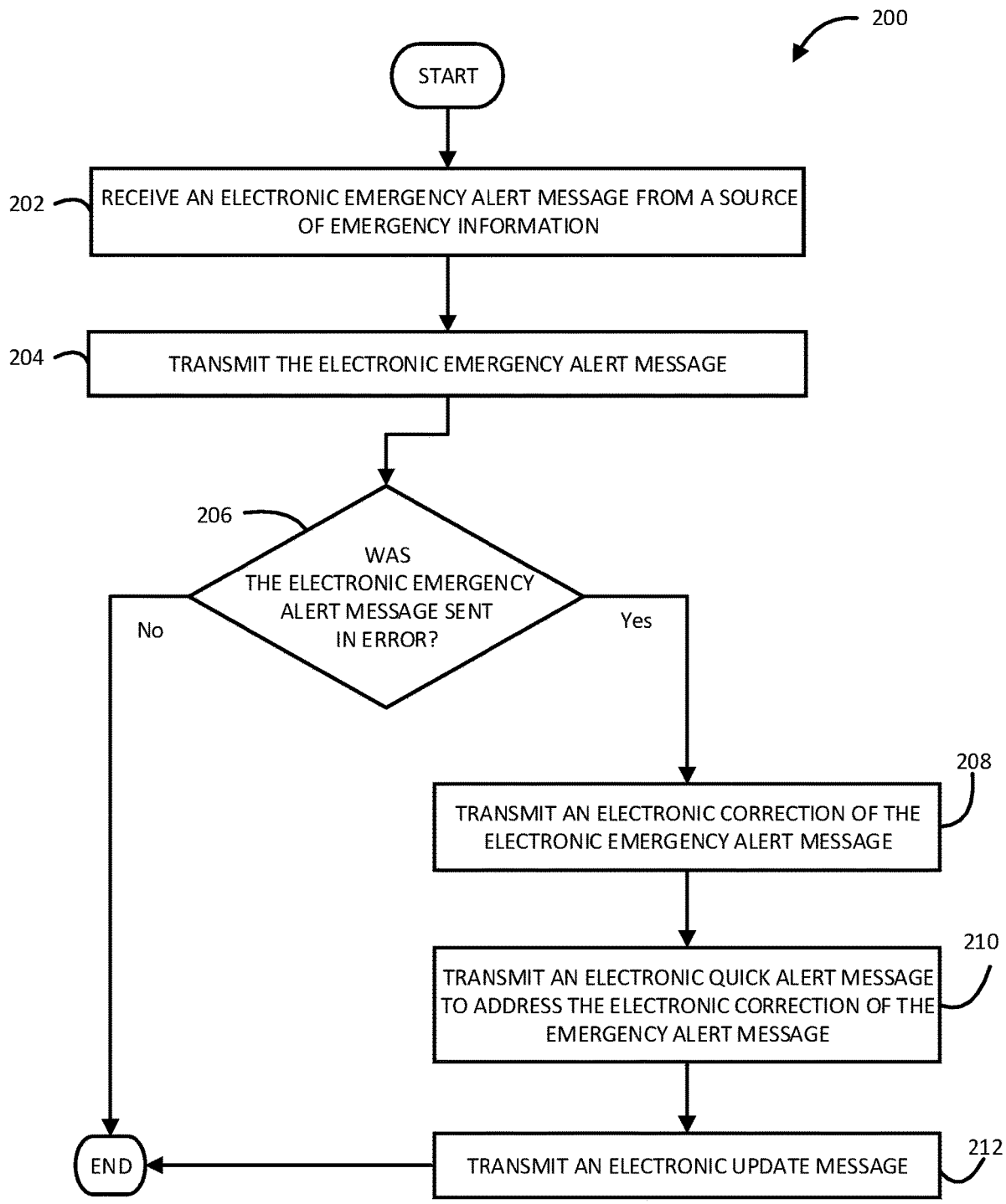
FIG. 2 is a flowchart of a method for communicating a correction to an electronic emergency alert message in accordance with the current disclosure.

FIG. 2 is a flowchart of an exemplary method 200 for communicating a correction to an electronic emergency alert message 106 from an electronic emergency alert system 100 to the one or more electronic devices 112.

At a block 202, an electronic emergency alert message 106 may be received from a source of emergency information. In one embodiment, the electronic emergency alert message 106 may be received by the wireless telecommunications system 110 from the emergency alert gateway 105 of the emergency management organization 104. As noted above, the source of emergency information may be a government agency or a quasi-government agency.

Figure 3A:
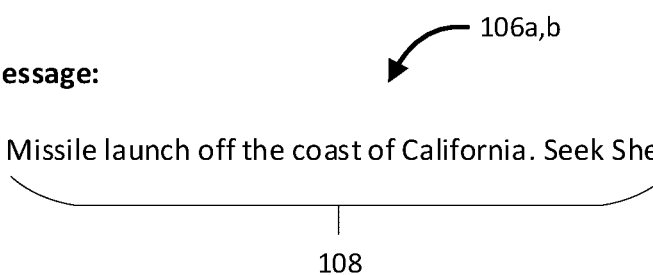
FIG. 3A is an example emergency alert messages sent in accordance with the current disclosure.

At a block 204, the electronic emergency alert message 106 may be transmitted. In one embodiment, the electronic alert message 106 may be transmitted to the one or more electronic devices 112 via a wireless telecommunications system 110. The electronic emergency alert message 106 may include a free form electronic text message 108 (see FIG. 3A). In one embodiment, the free form text message 108 may be a word or phrase. In another embodiment, the free form text message 108 may be one or more sentences as shown in FIG. 3A.

The electronic emergency alert message 106 may include an emergency indication 114. In one embodiment, the emergency indication 114 may indicate that the electronic emergency alert message 106 has a higher importance than other electronic messages or services. Thus, the wireless telecommunications system 110 may prioritize the transmission of the electronic emergency alert message 106 over other cellular services. In another embodiment, the emergency indication 114 may cause the one or more electronic devices 112 to emit a sound, flash, or vibration, or other visual, sound, or haptic cue to draw the user's attention to their electronic device upon receipt of the electronic emergency alert message 106.

At a block 206, whether the electronic emergency alert message 106 was sent in error (e.g., a completely false alert was sent or critical information was missing or incorrect) may be determined. Whether the electronic emergency alert message 106 was sent in error may be determined by the source of emergency information, e.g., the alert originator 102, the emergency management organization 104, or by another organization or entity. In one embodiment, an employee of the alert originator 102 or the emergency management organization 104 may determine an error occurred and may then trigger the sending of a correction to the message. If the electronic emergency alert message 106 was not sent in error, the method exits. If the electronic emergency alert message 106 was sent in error, then the method continues at block 208.

At block 208, an electronic correction of the electronic emergency alert message 106 may be transmitted. In one embodiment, the electronic correction of the electronic emergency alert message may be generated by and transmitted from the source of emergency information (e.g., the alert originator 102 and/or the emergency management organization 104) to the wireless telecommunications system 110, which in turn transmits the correction to the electronic emergency alert message to the one or more electronic devices 112. In another embodiment, the electronic correction of the electronic emergency alert message may be generated by and transmitted by the wireless telecommunications system 110 to the one or more electronic devices 112.

The transmission of the electronic correction may be performed after determining that the electronic emergency alert message 106 was transmitted in error or contains a critical information error. In one embodiment, the electronic correction may be a cancellation of the electronic emergency alert message 106. In another embodiment, the electronic correction may be an update message.

At a block 210, an electronic quick alert message 118 (see FIG. 3B) to address the electronic correction of the emergency alert message may be transmitted. In one embodiment, the electronic quick alert message 118 may be generated by and transmitted from the source of emergency information (e.g., the alert originator 102 and/or the emergency management organization 104) to the wireless telecommunications system 110, which in turn transmits the electronic quick alert message 118 to the one or more electronic devices 112. In another embodiment, the electronic quick alert message 118 may be generated by and transmitted by the wireless telecommunications system 110 to the one or more electronic devices 112. The electronic quick alert message 118 may be transmitted automatically upon receipt of the electronic correction of the electronic emergency alert message.

Figure 3B:
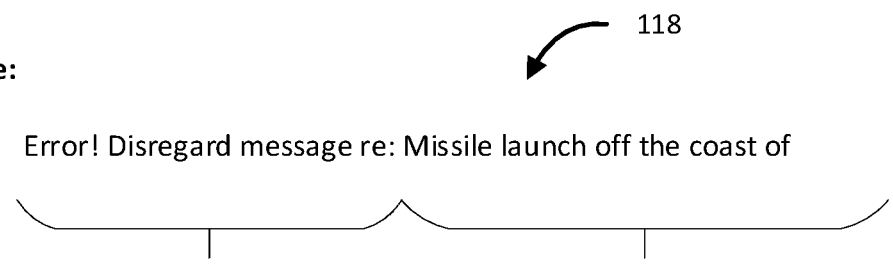
FIG. 3B is an example quick alert messages sent in accordance with the current disclosure.

As shown in FIG. 3B, the electronic quick alert message 118 may include a first text segment 120. The first text segment 120 may include predetermined text to indicate a correction to the electronic emergency alert message. The predetermined text may be a word, phrase or sentence, alone or together with punctuation, a number, or symbol. For example, as shown in FIG. 3B the predetermined text may be the phrase "Error! Disregard message re:". The predetermined text may be text that is created in advance of a correction. In one embodiment, the same predetermined text may be used for all corrections to emergency alert messages that are sent in error or contain critically incorrect or missing information. In another embodiment, different predetermined texts may be created and used for different types of emergency situations (wildfire v. lost child), for different geographic locations, or for different levels of error in the original message, such as a mistakenly sent imminent threat alert versus an alert with incorrect critical information.

Use of predetermined text enables the electronic quick alert message to be generated quickly and automatically by the alert originator or the emergency management organization. In one embodiment, an employee of the alert originator or the emergency management organization may use a keyboard, key pad, touch screen, or voice command to initiate the generation and/or sending of the electronic quick alert message via one or more of the alert device 103 and the emergency alert gateway 105. The generation of the quick alert message may be initiated upon a single touch or sequence of touches to a keyboard, key pad, or touch screen, or a single or series of voice commands.

The electronic quick alert message 118 may include a second text segment 122. The second text segment 122 may include at least a portion of the free form text message 108. In one embodiment, the portion of the free form text message 108 included may be a single word. In another embodiment, the portion may be a phrase or sentence from the free form text message 108. For example, as shown in FIG. 3A, second text segment 122 may be the first sentence of the emergency alert message: "Missile launch off the coast of California."

At a block 212, an electronic update message 124 may be transmitted. The electronic update message 124 may include additional information about the error or critical omission. For example, as shown in FIG. 3C the electronic update may include some of the free from text message 108 along with additional text explaining the error or false information.

In one embodiment, the electronic update message 124 may be generated by and transmitted from the source of emergency information (e.g., the alert originator 102 and/or the emergency management organization 104) to the wireless telecommunications system 110, which in turn transmits the electronic update message 124 to the one or more electronic devices 112. In another embodiment, the electronic update message 124 may be generated by and transmitted by the wireless telecommunications system 110 to the one or more electronic devices 112.

Figure 3C:
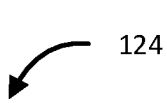
FIG. 3C is an example update messages sent in accordance with the current disclosure.

FIGS. 3A, 3B, and 3C illustrate example messages that may be sent by the electronic emergency alert system 100 and when they may be sent. For example, FIG. 3A illustrates an example emergency alert message 106 that may be sent at 10:30 am PST. After a determination is made that the emergency alert message 106 was sent in error, the electronic emergency alert system 100 may automatically transmit or be prompted to send a prompt quick alert message (e.g., a few minutes later at 10:32 am PST) as shown in FIG. 3B. In one embodiment, an employee at the alert originator 102 or the emergency management organization 104 may determine an error occurred, e.g., either a completely false alert was sent or critical information was missing or incorrect. The employee may be able to initiate the method of correcting the emergency alert. The employee, for example, may send an emergency quick alert message 106 making one or two key strokes or finger taps on a keyboard, key pad, or, touch screen associated with the one or more alert devices 103 or the emergency alert gateway 105, or may use a voice command to initiate the generation and/or sending of the electronic quick alert message via the one or more alert devices 103 or the emergency alert gateway 105.

The purpose of the quick alert message is to quickly inform the public that the original emergency alert message 106 was sent in error so that they know not to act in accordance with the emergency alert message, and also so that the erroneous emergency alert message doesn't continue to spread via word of mouth, social media, email, etc. The quick alert message 118 also gives the alert originator and and/or the emergency management organization more time to figure out what triggered the erroneous emergency alert message and what information they want to provide to the public to explain the situation in an update message. For example, as shown in FIG. 3C, the update message 124 may be sent hours after the erroneous message was first sent.

The method and system disclosed herein are beneficial to both the wireless communications system 110, the alert originator 102, the emergency management organization 104, and the public. By automating the process of preparing the text of the electronic quick alert through the use of predetermined text and a portion of the original text of the false emergency alert, the emergency alert system can quickly and efficiently inform the public that an error was made and give the alert originator and/or the emergency management organization more time to prepare a comprehensive response and update. Automating the process also reduces the chance of errors being made when the alert message is generated. In addition, by taking just enough text from original emergency alert, the people in the alert area will understand that the quick alert is related to the original emergency message and not something else.

The method and system disclosed herein also reduce strain on the wireless communication system. If people are not aware that the original message was false, they will continue to send separate text messages, social media messages, or emails to others alerting them of the emergency. The sudden influx of messaging potentially places a heavy burden on the wireless communication system's network and may slow down or otherwise delay cellular services in the alert area.

Figure 4:
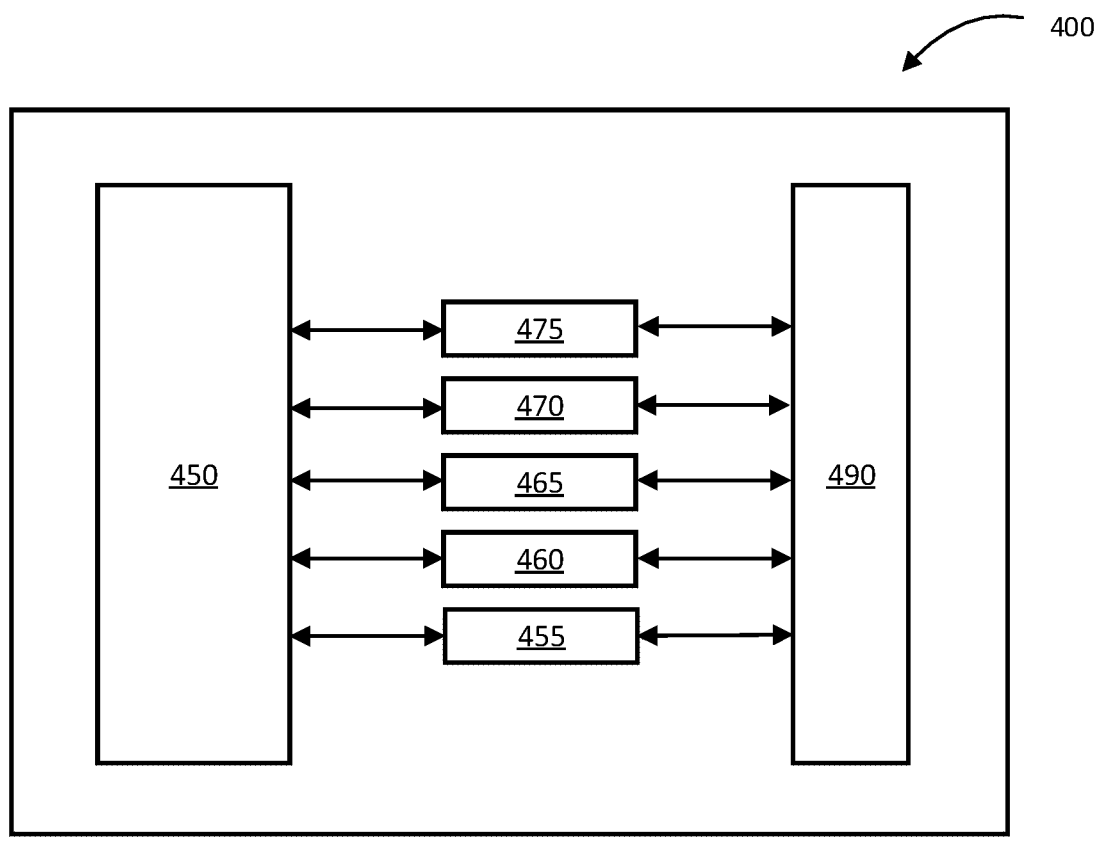
FIG. 4 is a schematic of an exemplary device in accordance with the current disclosure.

FIG. 4 may be an example computing device 400, for example, one or more electronic devices 112, alert devices 103, emergency alert gateway 105, CMSP Gateway 126, MME 128, or RAN 130. The computing device 400 may be physically configured to interact or communicate with other computing devices via a communication network. The computing device 400 may have a processor 450 that is physically configured according to computer executable instructions. The computing device 400 may have a power supply 455 such as a battery which may be rechargeable. The computing device 400 may also have a sound and video module 460 which assists in displaying video and sound and may turn off when not in use to conserve power and battery life. The computing device 400 may also have volatile memory 465 and non-volatile memory 470 as well as internal storage 475 or external storage. The computing device 400 may have an input/output bus 490 that shuttles data to and from various user input devices such as a keyboard, mouse, speakers, or other inputs. It also may control communicating with other computing devices and system components, either through wireless or wired devices. Of course, this is just one embodiment of the computing device 400 and the number and types of computing devices 400 is limited only by the imagination.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The computing devices, computers, routers, and servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, computers, routers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method for communicating a correction to an electronic emergency alert message from an electronic emergency alert system to a plurality of electronic devices, comprising:
    transmitting the electronic emergency alert message, wherein the electronic emergency alert message comprises:
        a free form electronic text message; and
        an emergency indication;
    transmitting an electronic correction of the electronic emergency alert message, wherein the electronic emergency alert message comprises a cancellation of the transmission of the electronic emergency alert message; and,
    transmitting an electronic quick alert message to address the electronic correction of the electronic emergency alert message automatically upon receipt of the correction of the electronic emergency alert message, wherein the electronic quick alert message comprises:
    a first text segment comprising predetermined text to indicate a correction to the electronic emergency alert message is being transmitted; and
    a second text segment comprising at least a portion of the free form electronic text message.

2. The method of claim 1, wherein the free form electronic text message comprises information about an emergency.

3. The method of claim 1, further comprising, receiving the electronic emergency alert message from a source of emergency information.

4. The method of claim 3, wherein the source of emergency information is a government agency or a quasi-government agency.

5. The method of claim 1, wherein the correction of the electronic emergency alert message is transmitted after determining that the electronic emergency alert message was transmitted in error.

6. The method of claim 5, further comprising the step of: transmitting an electronic update message, wherein the electronic update message includes information about the error.

7. The method of claim 1, wherein the emergency indication indicates the electronic emergency alert message has a higher importance than other electronic messages.

8. The method of claim 1, wherein each of the electronic devices in the plurality of electronic devices is a mobile phone, tablet, or laptop.

9. The method of claim 1, wherein the predetermined text is created before the electronic emergency alert message is sent.

10. A system for communicating a correction to an electronic emergency alert message from an electronic emergency alert system to a plurality of electronic devices, comprising:
a telecommunications network having a processor;
the processor is configured to:
transmit the electronic emergency alert message, wherein the electronic emergency alert message comprises:
a free form electronic text message; and
an emergency indication;
transmit an electronic correction of the electronic emergency alert message, wherein the electronic emergency alert message comprises a cancellation of the transmission of the electronic emergency alert message; and
transmit an electronic quick alert message to address the electronic correction of the electronic emergency alert message automatically upon receipt of the electronic correction of the electronic emergency alert message, wherein the electronic quick alert message comprises:
a first text segment comprising predetermined text to indicate a correction to the electronic emergency alert message is being transmitted; and
a second text segment comprising at least a portion of the free form electronic text message.

11. The system of claim 10, wherein the free form electronic text message comprises information about an emergency.

12. The system of claim 9, wherein the processor is configured to:
receive the electronic emergency alert message from a source of emergency information.

13. The system of claim 9, wherein the correction of the electronic emergency alert message is transmitted after determining that the electronic emergency alert message was transmitted in error.

14. The system of claim 13, wherein the processor is configured to:
transmit an electronic update message, wherein the electronic update message includes information about the error.

15. A processor-readable tangible non-transitory medium storing processor-issuable instructions configured to cause a processor to:
transmit the electronic emergency alert message, wherein the electronic emergency alert message comprises:
a free form electronic text message; and
an emergency indication;
transmit an electronic correction of the electronic emergency alert message, wherein the electronic emergency alert message comprises a cancellation of the transmission of the electronic emergency alert message; and
transmit an electronic quick alert message to address the electronic correction of the electronic emergency alert message automatically upon receipt of the electronic correction of the electronic emergency alert message, wherein the electronic quick alert message comprises:
a first text segment comprising predetermined text to indicate a correction to the electronic emergency alert message is being transmitted; and
a second text segment comprising at least a portion of the free form electronic text message.

16. The processor-readable tangible non-transitory medium of claim 15, wherein the free form electronic text message comprises information about an emergency.

\* \* \* \* \*